Nov. 2, 1965     R. P. SALLEN     3,215,934
SYSTEM FOR QUANTIZING INTELLIGENCE ACCORDING TO
RATIO OF OUTPUTS OF ADJACENT BAND-PASS FILTERS
Filed Oct. 21, 1960     6 Sheets-Sheet 1

FIG. 1

PRIOR ART

INVENTOR.
ROY P. SALLEN
BY
ATTORNEY

Nov. 2, 1965 R. P. SALLEN 3,215,934
SYSTEM FOR QUANTIZING INTELLIGENCE ACCORDING TO
RATIO OF OUTPUTS OF ADJACENT BAND-PASS FILTERS
Filed Oct. 21, 1960 6 Sheets-Sheet 2

INVENTOR.
ROY P. SALLEN
BY Spencer E. Olson
ATTORNEY

FIG. 6

INVENTOR.
ROY P. SALLEN
ATTORNEY

Nov. 2, 1965  R. P. SALLEN  3,215,934
SYSTEM FOR QUANTIZING INTELLIGENCE ACCORDING TO
RATIO OF OUTPUTS OF ADJACENT BAND-PASS FILTERS
Filed Oct. 21, 1960  6 Sheets-Sheet 4

INVENTOR.
ROY P. SALLEN
BY Spencer E. Olson
ATTORNEY

3,215,934
SYSTEM FOR QUANTIZING INTELLIGENCE ACCORDING TO RATIO OF OUTPUTS OF ADJACENT BAND-PASS FILTERS
Roy P. Sallen, Waltham, Mass., assignor to Sylvania Electric Products Inc., a corporation of Delaware
Filed Oct. 21, 1960, Ser. No. 64,074
6 Claims. (Cl. 324—77)

This invention relates generally to electronic systems and is more particularly concerned with an improved system for measuring a characteristic of a signal, such as its frequency, or the location of its source.

A common problem in the design and operation of many electronic systems such as communications, radar or countermeasure systems, is to rapidly measure to within some prescribed tolerance the frequency of a continuous or pulsed carrier signal. If the frequency tolerance is a reasonable fraction of the band or range of frequencies from which the signal is to be chosen, the measurement is conveniently made by selecting from a plurality of adjacent frequency channels the channel whose pass band includes the input signal frequency. With the frequency thus roughly determined, more precise instrumentation may be employed more accurately to measure the frequency. This process of selecting from a series of adjacent frequency channels the particular channel which includes the input signal frequency is known in the art as frequency quantization. The process is not limited to the frequency characteristic of a signal, however, but may be applied in the selection of other parameters, such as temperature or illumination intensity, as well.

The implementation of a frequency quantizing system generally includes a plurality of band pass wave filters with successively adjacent pass bands to represent a like plurality of channels over the frequency band of interest. An input signal whose frequency is to be measured is applied in parallel to all of the filters, the channel in which the signal frequency appears being indicated by means of circuits which respond to the relative amplitude of the outputs of the filters. In one prior art circuit with which applicant is familiar, the limits of each identification channel in the band of interest are coincident with the cross-over points of adjacent filters. The frequency of the input signal is then determined by selecting the filter which exhibits an output signal having the largest amplitude. The principal disadvantage of this system is the difficulty of determining which filter has the greatest response should the signal frequency fall near the point of cross-over of the response characteristics of adjacent filters. Practical filter circuits generally exhibit some ambiguity at the cross-over point, particularly for low level input signals. To correct for these ambiguities, additional circuit means are normally required to avoid the selection of both channels, or of neither channel, when the signal frequency is in the cross-over region.

This prior art system, moreover, since it depends on the absolute amplitudes of the output signals from the several filters, restricts the amplitude dynamic range of the input signal. This can be corrected to some extent by connecting a fixed amplitude threshold detector to each of the filter channels to select the channel or channels having an output exceeding a pre-selected value. With this modification, however, the filter response characteristic must have steep skirts to reduce frequency error resulting from inherent ambiguity errors. On the other hand, the use of filters with steep skirts may introduce undesirable transient responses to pulsed input signals which would limit the speed of channel selection or cause erroneous selection.

With an appreciation of the aforementioned limitations in prior art frequency quantizing systems and techniques, applicant has as the primary object of his invention to provide an improved method and apparatus for quantizing intelligence in a signal.

Another object of the invention is to provide a channel selection or quantizing system requiring fewer band pass devices to span a given band of interest than are required in prior art systems for the same number of identification channels.

A more specific object of the invention is to provide a frequency quantizing system capable of channelizing the frequency of a signal into narrower channels than those delineated by the spacing between cross-over points, while utilizing filters whose characteristics have relatively shallow skirts to improve their transient response and shorten their response time.

Another object of the invention is to provide a frequency channelizing system capable of dependably selecting one and only one channel from a plurality of adjacent identification channels to indicate the frequency of a signal falling within a selected range or band of interest.

Still another object of the invention is to provide a system, employing the foregoing techniques, for determining the location of a source of light within a range of possible locations of the light source.

A further general object of the invention is to provide a system having the foregoing characteristics without the use of complicated and expensive circuitry.

Briefly, these objects are attained in accordance with the invention by a plurality of devices each capable of producing an output signal whose amplitude is maximum for a portion of the range of parameter values to which the device is responsive, and decreases in value as the signal parameter departs from said portion of the range. By way of example, the devices may be electrical filters having different "center" frequencies but adjacent response characteristics, typically of generally parabolic shape, which overlap. A number of bandpass devices sufficient to encompass a predetermined range or band of interest are provided. The band of interest is arbitrarily divided into a larger number of identification channels than filters, the identification channels being correlated with the response characteristics of the filters in a manner to determine the frequency of an input signal to a tolerance closer than the bandwidth of a particular filter. More specifically, alternate ones of the identification channels are associated with the central portion of successive response characteristics, with intermediate ones of the identification channels associated with the region of cross-over between successive response characteristics. Preferably the identification channels are all of the same width; i.e., each covers an equal fraction of the range of interest. The filters all have a common input to which the signal whose frequency is to be determined is applied, those filters in whose pass characteristic the frequency falls producing an output signal of amplitude dependent upon the position of the frequency within their pass characteristic. The ratio of the amplitudes of the outputs of the two filters giving the greatest response, which necessarily are filters having adjacent pass bands, is compared to the ratio of the responses these two filters would have for frequencies occurring at the limits of the identification channels straddling the cross-over region of the pass characteristics of the two filters. The latter ratio is conveniently, although not necessarily, the same for the limits of all of the identification channels. If P and Q are used to designate the highest and next highest responses, respectively, at the limits of the identification channels, this ratio may be expressed as $P/Q$, and is conveniently established as a reference voltage. If upon application of an input signal to the bank of filters the ratio between the two most significant filter outputs exceeds the ratio $P/Q$, the system is operative to indicate that the frequency of the signal is in the identification channel associated with the central portion of the pass characteristics of the filter producing the largest response. On the other hand, if the measured ratio is less than the ratio $P/Q$, the system is operative to indicate that the signal frequency is within the identification channel which straddles the cross-over region of the pass characteristics of the two filters exhibiting the largest response. Thus, the signal frequency is measured to a tolerance equal to the width of an identification channel, which is considerably less than the pass band of any of the filters. Stated another way, in the present system there are significantly more identification channels than filters, the number of channels, C, being related to the number of filters, F, by the general formula: $C=2F-1$. Thus, in a system having a large number of identification channels, the number of filters required is approximately one-half the number of identification channels.

In addition to being useful for frequency quantizing, the principles of the invention are uniquely applicable for the rapid determination of the location of a light source, whether it be radiating or reflecting, within a predetermined field of view. In accordance with the invention, the field of view is arbitrarily divided into a plurality of segments, each segment being monitored by an optical sensing device having a response characteristic capable of indicating whether the source is positioned within its corersponding sector. Ideally, the spatial response characteristic of the optical sensing device corresponds generally to the response characteristics of an electrical filter, with the characteristics overlapping as in the case of the electrical filters. Suitable circuitry following the sensing devices, functionally comparable to the circuits described in the preceding paragraph, compare the ratio of the outputs of the two most responsive sensing devices to indicate in which segment the source is located.

Other objects, features and advantages of the invention will become apparent, and a better understanding of its organization and operation will be had from the following detailed description, taken in conjunction with the accompanying drawings, in which.

Figure 1:
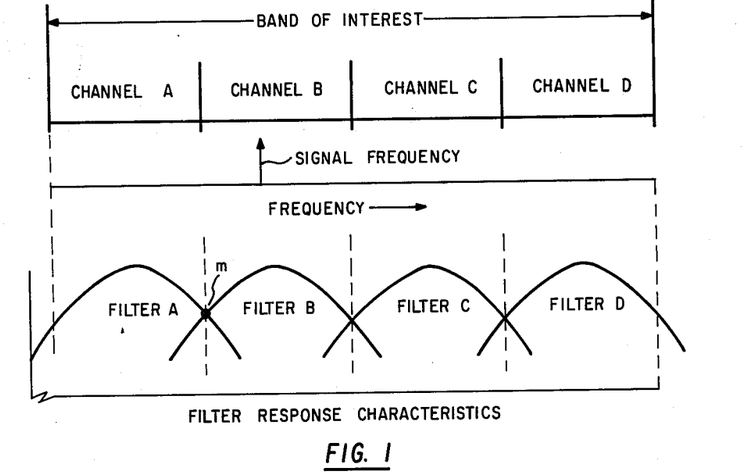
FIG. 1 is a diagram illustrating the prior art concept of frequency channel selection to which reference has been made.
Figure 2:
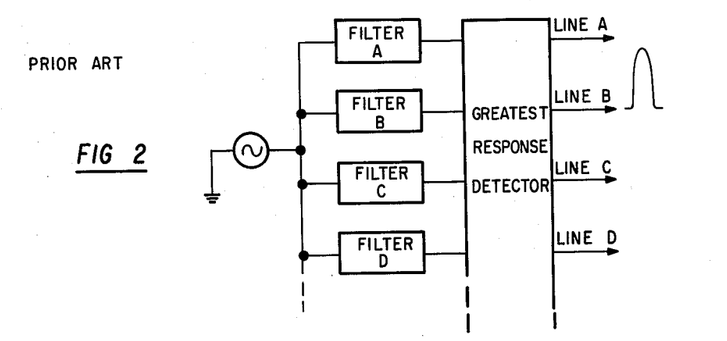
FIGS. 2 and 3 are schematic block diagrams illustrating alternative systems for implementing the channel selection concept illustrated in FIG. 1.
Figure 3:
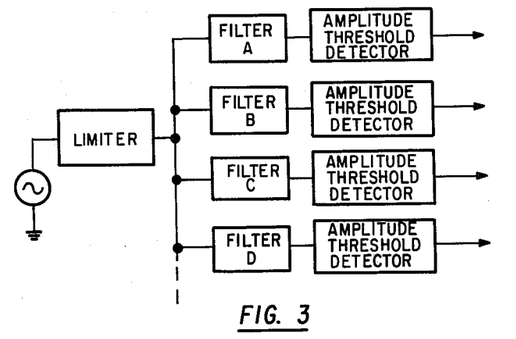

Better to understand the problem with which the present invention is concerned, reference is made to FIGS. 1, 2 and 3 for a fuller discussion of the prior art techniques of frequency quantizing alluded to earlier. Referring to FIG. 1, the problem, generally stated, is rapidly to measure to some given tolerance the frequency of a continuous or pulsed carrier signal which may be present or occur within a selected band of interest. This is accomplished in prior art systems by dividing the band of interest into a series of adjacent channels, designated A, B, C and D, and with suitable frequency selection means determining in which of those channels a received signal falls. Thus, the frequency of the input signal is measured to a tolerance no better, and often worse, than the width of any one of the channels. It follows, therefore, that accuracy of measurement could be improved by increasing the number of channels. The practical implementation of this prior technique has employed a plurality of band-pass wave filters having successively adjacent pass bands which correspond to the identification channels in the band of interest. As shown in FIG. 1, the limits of a particular channel coincide with the half-power points of the response characteristic of the filter corresponding to that channel. Or, stated more generally, each of the channels in the band of interest corresponds with the portion of the pass band of a respective filter lying between the points of cross-over.

Referring to FIG. 2, the input signal whose frequency is to be determined is applied in parallel to all of the filters, the appropriate channel being selected by means of circuits for comparing the amplitude of the output signals from the several filters. The circuit designated as Greatest Response Detector may be used to determine from which of filters A, B, C or D the output response is the largest. That is, should the signal frequency fall in channel B as shown in FIG. 1, a response would appear only on output line B. The principal deficiency of this system is the difficulty of determining which of two adjacent filters has the greatest response should the signal frequency happen to fall in the region of cross-over of their response characteristics. For example, should the signal freqeuncy fall at point $m$, the output of filters A and B would be of essentially equal amplitude, causing an output on both lines A and B with the consequence that the frequency of the signal would be measured only to the accuracy of the combined width of channels A and B. Obviously, then, additional means are required to avoid the selection of both channels, or of neither channel, when the signal frequency falls in the cross-over region.

It will be appreciated that the amplitude of the output of the detector of FIG. 2 will vary proportionately with the amplitude of the input signal besides being dependent on the position of the signal frequency within the response characteristics. That is, a signal falling in channel A, for example, may have an input amplitude of 10 volts and a signal received by another channel at another time may have an amplitude of only 2 volts. In order for the system to operate properly, the threshold level must be a function of the amplitude of the incoming signal, high for the 10 volt input signal and reduced for the 2 volt input. This situation complicates the nature of the circuitry following the detector and is desirably avoided. FIG. 3 illustrates one approach to the problem wherein a limiter is inserted in advance of the bank of filters so as to apply constant amplitude signals to all of the filters regardless of variations in the amplitude of the received signal. This permits each filter to be followed by an amplitude threshold detector which is operative to produce an output signal only when the output of its corresponding filter exceeds an unvarying predetermined level. In this system it is essential that the threshold level be maintained precisely at a level corresponding to inputs whose frequencies occur at the cross-over points of the overlapping filter characteristics. Failure to maintain this level leads to ambiguity of response, or lack of response, in the cross-over region. To minimize this ambiguity, filters having response characteristics with steep skirts at their edges are required. This requirement, however, introduces another troublesome problem of undesirable transient responses which limit the speed and accuracy of channel selection.

Figure 4:
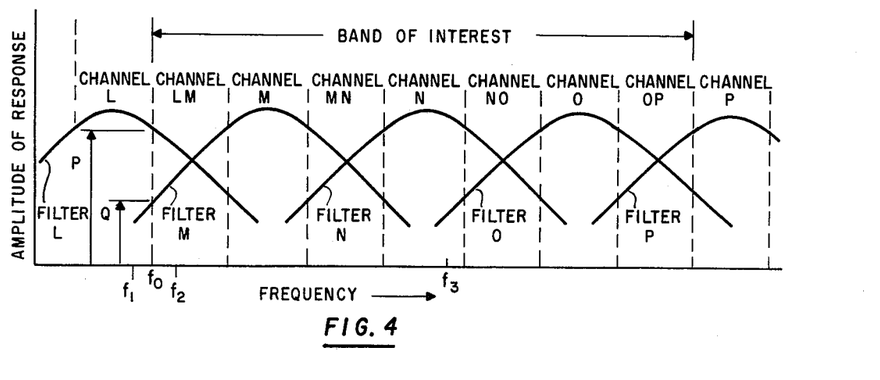
FIG. 4 is a diagram illustrating applicant's improved technique of frequency quantization.

The foregoing disadvantages of the prior art systems are overcome, and the speed and accuracy of channel selection improved in accordance with this invention, by dividing a corresponding frequency band of interest into a larger number of identification channels and selecting one, and only one, of the channels to indicate the frequency of an incoming signal. The larger number of channels are obtained, however, without the corresponding increase in the number of filters as would be required in the prior art technique; in fact, the present technique affords significantly more identification channels than the number of filters. Referring to FIG. 4, this is achieved by representing alternate identification channels by the center portion of the response characteristic of a plurality of filters having different center frequencies and adjacent pass bands, and representing other channels intermediate those just described by the regions of crossover of the response characteristics of the filters. More specifically, in the example of FIG. 4, the indicated band of interest is arbitrarily divided into seven channels (limited by the vertical dotted lines) designated channels LM, M, MN, N, NO, O, and OP. As will be more fully described hereinafter, selection from among these channels is achieved with only five filters having successive pass bands wholly or partly within the band of interest, the response characteristics of the respective filters being designated filter L, filter M, filter N, filter O, and filter P. It will be noted that channel L, omitted from the foregoing list of channels in the band of interest, coincides with the central portion of the response characteristic of filter L, and that the next adjacent channel, LM, is positioned over, or straddles, the cross-over region of the response characteristics of adjacent filters L and M. Similarly identification channels M, N, O and P correspond to the central portion of the response characteristic of their respective filters, with channels MN, NO, and straddling the crossover points of the characteristics of successive filters. Although nine identification channels are represented in FIG. 4, for reasons which will become apparent later channels L and P cannot determine the frequency of an input signal to an accuracy within the tolerance of its pass band; consequently, there are but seven effective identification channels covering the band of interest. It is significant to note, however, that there are two more effective channels than there are filters in the illustrated example, the general formula relating the number of channels C and the required number of band-pass filters, F, being $C=2F-3$. Thus, a twenty-one channel system, as another example, would require only twelve band-pass filters.

The boundary limits of the identification channels, preferably, but not necessarily of equal width, are arbitrarily located or determined in terms of the ratio of the responses of adjacent filters. For example, if an input signal has the frequency $f_0$ indicated in FIG. 4, both filters L and M will respond, the response P of filter L, however, being greater than the response Q of filter M. The ratio $P/Q$ defines the boundary between identification channels L and LM, and, provided adjacent filters have substantially identical pass band characteristics, similarly determines the boundaries of all of the other identification channels. Assuming now an input signal frequency of $f_1$, slightly lower than $f_0$, it will be seen that the ratio of the response of filters L and M exceeds the ratio $P/Q$, indicating that the frequency is in channel L. On the other hand, if the input frequency is slightly greater than $f_0$, say $f_2$, the ratio of the responses of filters L and M is less than $P/Q$ indicating that the frequency is in channel LM. The ratio $P/Q$ is conveniently established as a voltage level against which the ratio of the responses of adjacent filters to an input signal can be compared, the result of the comparison indicating in which of the identification channels the signal frequency is located.

Figure 5:
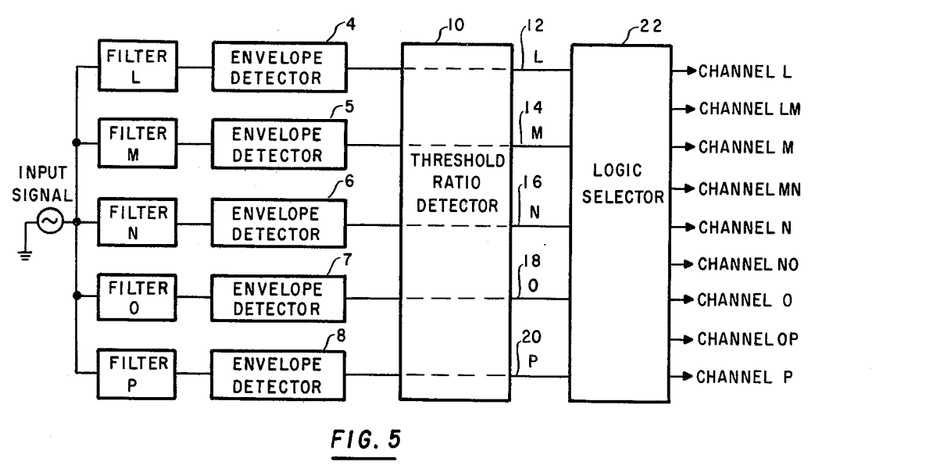
FIG. 5 is a block diagram of a system for implementing the concept illustrated in FIG. 4.

FIG. 5 is a block diagram of a system for implementing this channel selection technique which includes a bank of filters L through P having a common input to which is applied the signal whose frequency it is desired to measure. The outputs of these filters, whose band-pass characteristics overlap as shown in FIG. 4, are detected in a respective envelope detector, 4, 5, 6, 7 and 8. The output signals from the detector are applied to a circuit identified by numeral 10 and designated Threshold Ratio Detector. This circuit compares the responses of adjacent filters (should there be a response from two) and compares this ratio with the critical ratio $P/Q$ to determine in which identification channel the frequency falls. Although specific circuitry for performing these functions will be described later, it will be helpful at this juncture to delineate the characteristics and functions of circuit 10. Salient characteristics of the circuit are as follows:

(1) It responds only to the filter with the highest amplitude output signal if the ratio of that signal to the output signals from any of the other filters exceeds the critical value $P/Q$.

(2) It responds only to the filters contributing the two highest amplitude signals if the ratio of the largest to the second largest is less than the critical ratio $P/Q$.

(3) It provides an output signal, such as a pulse, to output connections 12, 14, 16, 18 and 20 whenever the corresponding input line responds as in (1) or (2).

Thus, the threshold ratio detector never has indicator signals on more than two output lines for a given input signal.

In order to indicate in which identification channel the signal frequency is, especially if there are indicator signals on two output lines of the ratio detector, the indicator signals are applied to suitable logic circuitry, designated logic selector 10. The logic selector, it will be noted, has more output lines than inputs, one being provided for each of the channels of FIG. 4, including channels L and P which lie outside the band of interest. The logic selector may consist of conventional digital logical elements, a suitable arrangement of which will be described hereinafter, embodying the following logical rules:

(1) When only one input line has an indicator signal on it, a signal appears at the corresponding channel output line only. That is, if only line 14 has an indicator signal on it, an output signal appears only on the line marked "Channel M."

(2) When an indicator signal appears on adjacent input lines (e.g., lines 14 and 16), an output signal appears only on the output line between those corresponding to the active input lines (i.e., the channel designated MN between channels M and N).

It will be understood that the output lines of logic selector 22 would be connected to suitable utilization circuitry (not shown) which may consist of an indicator for showing on which channel the output signal appears.

Figure 6:
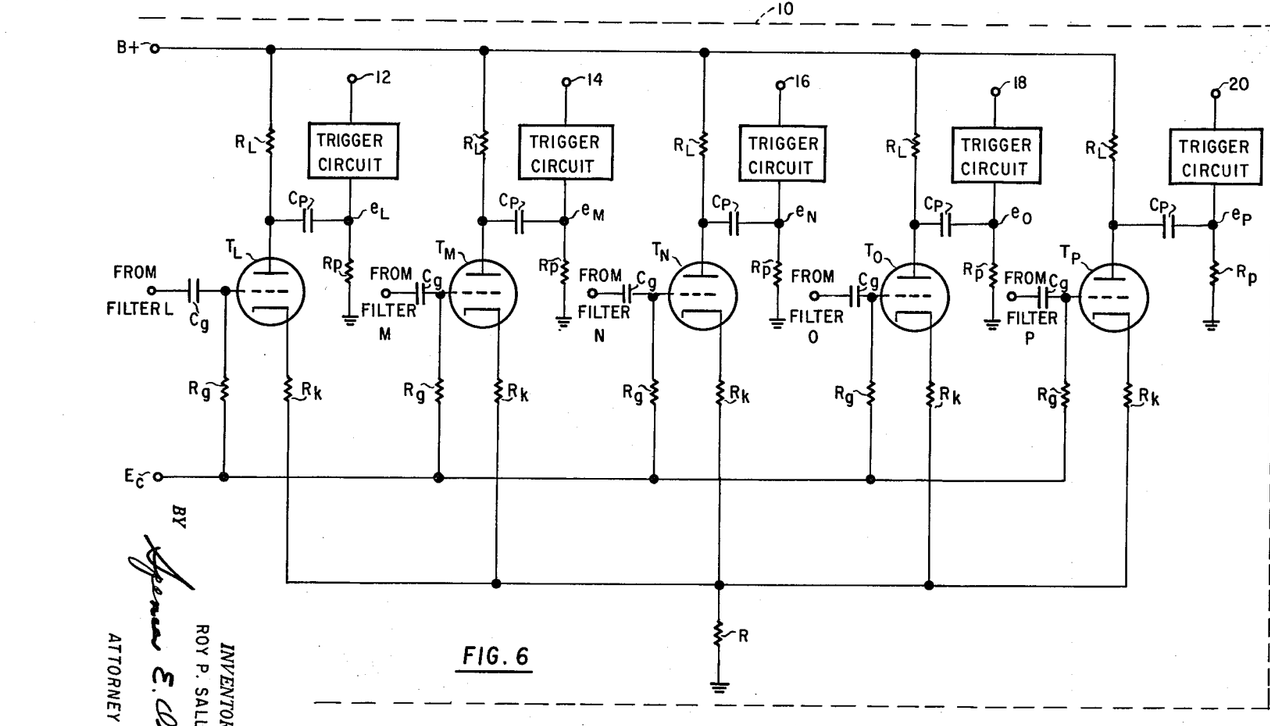
FIG. 6 is a schematic circuit diagram of one form of the threshold ratio detector shown in block form in FIG. 5.

Having described the overall operation of the block diagram representation of the system, reference is now made to the circuit diagram of FIG. 6 illustrating one way of implementing the functions of threshold ratio selector 10. The circuit consists of a plurality of identical stages equal in number to the number of filters used to cover the band of interest. For the five filter system of FIG. 5, which it should be understood is only by way of example, the threshold ratio detector likewise requires five stages. Each stage includes a vacuum tube T, for example a triode having anode, control grid, and cathode electrodes, to the control grid of which the output signal from a corresponding filter is applied through a coupling capacitor $C_g$. The input signal is developed across a resistor $R_g$ connected from the control grid to a source of biasing potential, designated $E_c$. The anode of the tube is connected through a load resistor $R_L$ to a source of B+ potential, and the cathode is connected through resistor $R_k$ and through a resistor R to a source of reference potential, shown as ground. The resistor R, it will be noted, is common to the cathode circuits of all of the stages. An output signal is derived from the plate of the tube by a coupling circuit consisting of a capacitor $C_p$ and a resistor $R_p$ arranged to activate an associated trigger circuit which applies an output signal to its corresponding output line. The terminals 12, 14, 16, 18 and 20 correspond to the lines coupling the ratio selector 10 to logic selector 12 in FIG. 5.

For purposes of the present description it will be assumed that the signals derived from the envelope detector are positive voltage pulses, and that the trigger circuits are operative in response to a negative-going pulse. The bias of the circuit and the relative values of $R_k$ and R are chosen such that the stage to which the larger of the two largest input signals is applied alone will respond if the ratio of its amplitude to the next greatest amplitude of any oher stage is equal to the channel defining ratio P/Q described earlier. As a rough approximation, the value of $R_k$ and R are chosen such that $$\frac{R_k + R}{R}$$

is equal to the ratio P/Q. It will thus be seen that the width of the identification channels straddling the cross-over regions between adjacent pass characteristics can be arbitrarily determined by selection of the values of $R_k$ and R. In effect, then, the ratio *P/Q* is stored in, or is inherent in, the operation of the circuit of FIG. 6, and if all stages are perfectly balanced and the response characteristics of all filters are identical with each overlapping the adjacent characteristics to the same degree, the identification channels straddling the cross-over regions all have the same width. Further, with appropriate selection of the ratio *P/Q*, the "straddling" channels can be made to have a width equal to the identification channels covering the center portion of the filter characteristics.

In operation, all of the tubes are biased to conduct appreciably in the absence of input signals whereby the plate of each is at a potential significantly below B+. Moreover, the circuit biases are set at a level such that the circuit is operative only in response to input signals above a certain minimum amplitude. First consider the case where the detector following filter N is the only one producing an output of amplitude sufficient to operate the circuit. Application of this signal to the control grid of tube T of the third stage causes this tube to conduct more heavily, further reducing the potential at the plate of the tube to produce a negative trigger pulse for actuating its associated trigger circuit. At the same time, increased conduction of tube $T_N$ increases the potential developed across common resistor R to a value sufficient to cut off conduction in the remaining tubes. The positive-going signals produced at the plates of the cut off tubes do not activate their corresponding trigger circuits, however, since, as was noted earlier, the trigger circuit responds only to negative-going pulses. Consequently, an output pulse appears only on output line 16.

Assume now that an input signal has a frequency lying in the cross-over region between two adjacent filters, for example, filters N and O. In this case, the detectors following filters N and O will each produce an output signal, the amplitudes of which could be equal, or differing to some degree depending upon where in the cross-over region the signal frequency falls. These output signals are respectively applied to the control grids of tubes $T_N$ and $T_O$, the ratio of their amplitudes determining whether only one, or both, of the tubes produce an output signal to actuate its associated trigger circuit. If the signal from filter N should be the larger, and the ratio of their amplitudes exceed the critical ratio *P/Q* (as would be the case for frequency $f_3$ in FIG. 4), conduction in tube $T_N$ would exceed that in tube $T_O$ sufficiently to cut the latter off, with the result that an output would be derived only from the third sage. Similarly, if the signal from filter O should be the larger, and their ratio in excess of *P/Q*, conduction in tube $T_O$ would predominate to cut off tube $T_N$ (and all other tubes as well) to cause an output signal to appear only at terminal 18.

If, however, the ratio of the amplitudes of the two signals is less than *P/Q* (regardless of which is the larger) neither of tubes $T_N$ and $T_O$ would conduct sufficiently to cut the other off, but there is enough conduction in each to result in the generation of a trigger activating signal at its corresponding plate. The combined increased conduction of the two tubes, however, increases the potential across resistor R sufficiently to cut off the rest of the tubes. Thus, the third and fourth stages each produce an output signal, appearing at terminals 16 and 18, respectively. Because the circuit is balanced, and because a particular signal frequency will produce a response of sufficient amplitude to activate the circuit only in two adjacent filters, the other stages function similarly to produce signals on either one output line, or on two adjacent output lines (FIG. 5), of the ratio selector.

It is significant to note that the operation of the threshold ratio detector does not require for its operation the absolute measurement of the amplitude of two signals, or selection of the greater of two amplitudes which may, under some conditions, be equal or nearly equal. Rather, the determination as to which stages produce an output signal is dependent on a comparison of the ratio of two signals with a predetermined ratio. Accordingly, wide variations in the amplitude of the input signal, or variations in the values of circuit components, do not deleteriously affect the ability of the system to locate the frequency of the signal within a particular identification channel.

Figure 7:
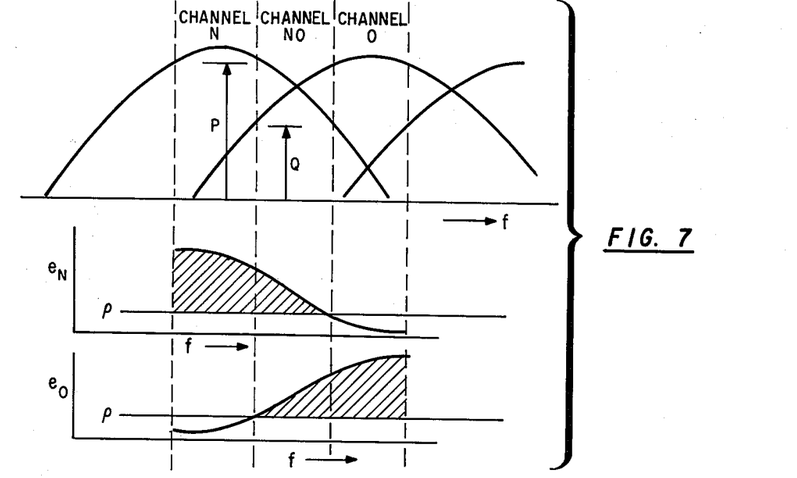
FIG. 7 is a series of wave forms useful in explaining the operation of the circuit of FIG. 6.

For a better understanding of the operation of the ratio detector of FIG. 6, reference is made to FIG. 7 which illustrates the operating characteristics of any two adjacent stages, for example the stages associated with filters N and O. The circuit is sensitive to only the two largest responses from the bank of detectors and these are necessarily from adjacent filters. The upper curves in FIG. 7 are the response characteristics of filters N and O which encompass channels N, NO, and O, as previously described. These curves illustrate that the amplitude of the signal applied to the third and fourth stages vary in accordance with the frequency of the input signal; that is, the amplitude is dependent upon where in the three illustrated channels the signal frequency happens to fall. The lower two curves show how the amplitude of the signals appearing at the plates of the tubes of the third and fourth stages vary with the frequency of the input signal *f*. It will be seen from a superposition of these three characteristics that three distinct output signal combinations exist in the three identification channels. In channel N, for example, the output $e_N$ of the third stage exceeds a predetermined level designated $\rho$, whereas the output $e_O$ of tube $T_O$ in the same channel is less than the level $\rho$. In channel $N_O$, the amplitude of both output signals $e_N$ and $e_O$ exceed the critical level $\rho$, and in channel O, the output of only tube $T_O$ exceeds the level $\rho$. Thus, if the trigger circuit associated with each stage responds only to input signals having an amplitude of $\rho$ or greater, it will be readily apparent that depending upon the input frequency the third stage alone may generate an output signal, the fourth stage alone may generate an output signal, or, if the frequency falls in the cross-over region, both stages may generate an output signal.

Figure 8:
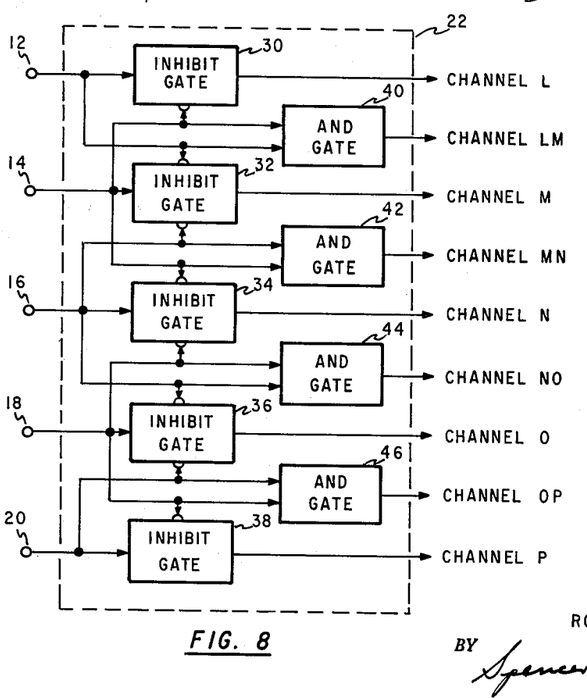
FIG. 8 is a block diagram of the logic selector diagrammatically illustrated in FIG. 5.

To determine in which channel the frequency of the input signal lies, the plate of each of the tubes in the ratio detector is applied to an associated trigger circuit through coupling network comprising a capacitor C and a resistor $R_p$. The trigger circuits are operative when actuated to apply indicating signals to their corresponding lines 12, 14, 16, 18, and 20 which are connected to the logic selector 22. Referring to FIG. 8, a logic selector possessing the characteristics enumerated in connection with FIG. 5 may comprise a plurality of "INHIBIT" gates 30, 32, 34, 36, 38 equal in number to the number of channels, and a plurality of "AND" gates 40, 42, 44 and 46, four "AND" gates being required for a five filter system. "INHIBIT" and "AND" gates being well known in the digital computer art, it is not considered necessary to here describe their circuitry in detail. Suffice it to say that an "INHIBIT" gate passes to its output a signal applied to its input unless an inhibiting pulse is simultaneously fed into any one of one or more inhibit terminals. An inhibit terminal is conventionally represented by a semi-circle attached to the sides of the block representing the gate, as shown. It will be noted that "INHIBIT" gates 30 and 38 each have but one inhibit terminal, whereas the remaining gates 32, 34 and 36 each have two inhibit terminals. The "AND" gate, as is well known in the art, is a circuit or device which produces an output only when every input is in its prescribed state. In the present case, the "AND" gate is operative to produce an output signal only when signals exceeding a predetermined level are simultaneously applied to both of the input terminals of the gate.

Considering the logic selector in more detail, input terminal 12 (connected to the trigger circuit of the ratio detector stage associated with filter L) is connected to the input terminal of "INHIBIT" gate 30, to one of the inhibit terminals of "INHIBIT" gate 32, and to one of the input terminals of "AND" gate 40. Line 14, associated with filter M, is coupled to the input terminal of "INHIBIT" gate 32, to an inhibit terminal of "INHIBIT" gates 30 and 34, and to one of the input terminals of each of "AND" gates 40 and 42. The remaining input terminals 16, 18 and 20 are similarly connected to corresponding "INHIBIT" and "AND" gates.

The operation of the logic selector 22 in "assigning" a particular received signal frequency to the appropriate channel will be understood by a review of the functions of the circuit enumerated in connection with FIG. 6, using the same filters and identification channels as the example. If the input frequency falls within channel L, where the ratio of the responses of the two adjacent filters L and M exceeds the critical $P/Q$, only the first stage of the ratio detector tube $T_L$, produces an output; i.e., only terminal 12 is energized. This signal is applied in parallel to "INHIBIT" gate 30 and to "AND" gate 40. There being no inhibit pulse from terminal 14 due to the second stage of the ratio detector being shut off, the pulse appearing on line 12 is transmitted by "INHIBIT" gate 30 to its output terminal, designated channel L. There is no output from "AND" gate 40 inasmuch as an input signal appears on only one of its input terminals. However, should the signal frequency fall within the channel straddling the cross-over region of the response characteristics of filters L and M, the ratio of the responses of the two filters is less than the critical ratio $P/Q$ and the first two stages of the ratio detector are both operative to apply signals to their respective output lines 12 and 14. In this situation, the signal on line 14 applied to the inhibit terminal of "INHIBIT" gate 30 prevents the signal on line 12 from passing to the output of this gate. Similarly, the signal on line 12 applied to one of the inhibit terminals of "INHIBIT" gate 32 prevents the signal appearing on line 14 from passing to the output of "INHIBIT" gate 32. The application of both signals simultaneously to the input terminals of "AND" gate 40, however, causes an output signal from this gate to indicate that the signal frequency is in channel LM. The frequency could not be erroneously assigned to channel MN since the response of channel N would be of insufficient amplitude in cooperation with the signal on line 14, to energize the "AND" gate 42. In other words, only the filters exhibiting the greatest and next to the greatest responses, which filters are necessarily adjacent, are effective to actuate the logic circuitry. If the ratio of these responses exceeds the ratio $P/Q$ then a single signal is applied to the logic selector and an indication appears on that channel identified with the central portion of the response characteristic of the filter exhibiting the larger response. On the other hand, if the ratio of the responses is less than $P/Q$, signals appear on two adjacent input lines to the logic selector, the "INHIBIT" gates and "AND" gates cooperating to assign the signal to the channel identified with the cross-over region of the characteristics of the two most responsive channels.

It will be apparent from the foregoing discussion that two "INHIBIT" gates and an "AND" gate are necessary to locate the frequency of an input signal within the tolerance of a particular identification channel of FIG. 4. In other words, an incoming signal having a frequency within the response characteristic of filter L, but lower than the lower boundary of channel L would activate the first stage of the ratio detector and produce a signal which would be transmitted by "INHIBIT" gate 30 and be "assigned" to channel L. Similarly, the described circuit could not distinguish whether the frequency of an input signal is in channel P or is of a higher frequency. However, since the central portions of the pass bands of filters L and P are at the extremities of the band of interest, output signals from logic selector 22 assigned to channels L or P may be used to provide the system with a means for indicating that the signal under surveillance has a frequency lying just beyond the optimum operating range of the system.

While the principles of the invention have been described in detail in connection with channel selection according to frequency, the present quantizing technique may also be applied to rapidly determine the location of a source of light within a prescribed sector or field of view. That is, the sector of interest may be similarly arbitrarily divided into identification channels or segments and the position of the light source located within one of these channels according to the response of optical sensing means rather than by frequency. As diagrammatically represented in FIG. 9, the sector of interest may be a slit or a line along which it is possible for a source of light to be present; for example, a point source or a small reflective area may be expected anywhere along the length of the line EK, the problem being to determine with accuracy the position of the source of light along that line. For the application of the present quantizing technique, the sector of interest is arbitrarily divided into a plurality of segments preferably of equal length, these segments being designated E–F, F–G, G–H, H–I, I–J and J–K for purposes of identification. To locate the position of the light source within one of these segments, the sector of interest is monitored by an optical sensing device 50 including, by way of example, three detecting devices 52, 54 and 56 each including a graduated light filter 60, a lens 62 and a photo-cell 64. The output of each of the photo-cells is applied to a respective trigger circuit capable of producing an output pulse when the amplitude of the signal derived from the photo-cell exceeds a predetermined threshold level. An indicator associated with each of the trigger circuits is activated by an output from the respective trigger circuit to indicate in which segment of the sector of interest the source of light is positioned.

Figure 9:
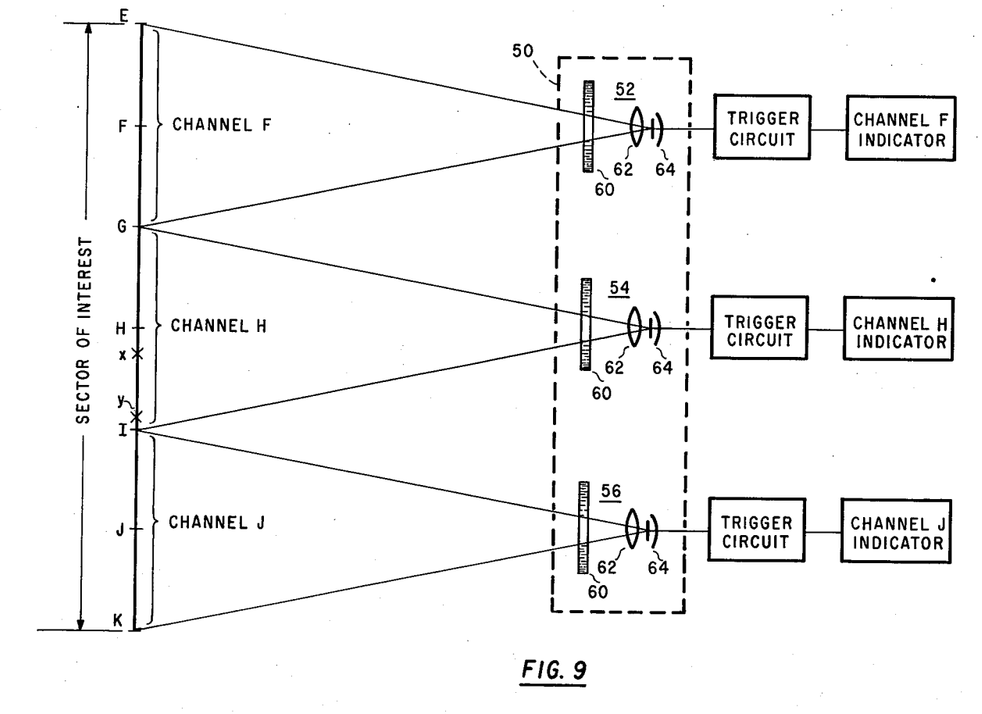
FIG. 9 is a block diagram of an optical system for accurately locating the position of a light source in a predetermined field of view.
Figure 10:
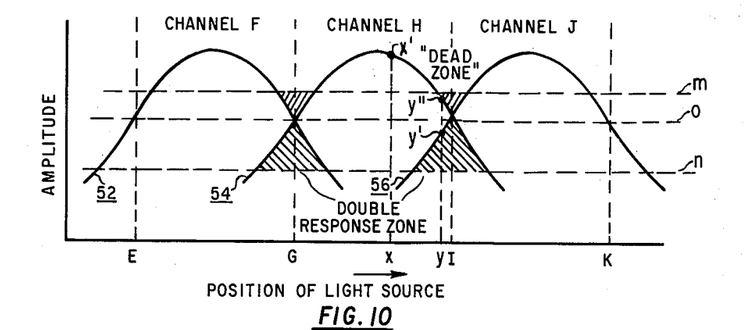
FIG. 10 is a diagram illustrating the response characteristics of the system of FIG. 9.

In order to derive positional information from the sensor 50, the optical filter 60 is designed to have maximum transparency at the center and gradually increasing opaqueness toward the edges whereby the spatial response characteristic of the filter corresponds generally in shape to the characteristics of an electrical filter as shown in FIG. 1. More specifically, a photo-cell in detecting device 52 would produce a greater output in response to a source of light of predetermined illumination intensity positioned at point F than it would to a source of the same intensity positioned at either E or G. If the filter is uniformly graduated from the center outwardly, the response curve corresponds to that shown in FIG. 10, where the responses of the three filters are plotted as a function of the position of the light source in the sector of interest. The amplitude of the output signal from each photo-cell being substantially directly proportional to the intensity of the light energy incident thereon, the curves of FIG. 10 also represent the output responses of the bank of photo-cells as a function of the position of the light source. In order to derive positional information from the output of the photo-cells, the filters are arranged with their optical axes aligned with the positional center of corresponding identification channels, the filters being so spaced that the cross-over points of adjacent filter characteristics correspond with the limits of the pre-assigned identification channels. More specifically, the optical filter of sensor 52 monitors the segment between points E and G, with the optical axis passing through point F; the filter of device 54 surveys channel H between points G and I; and the filter of device 56 covers channel J between point I and K. Thus, the response characteristics of the respective filters are correlated with these predefined channels of the sector of interest under surveillance. With reference to FIG. 10, channel F corresponds optically with the response characteristics of the filter in device 52, channel H corresponds optically with filter of device 54, and identification channel J corresponds optically with response characteristic of the filter in sensing device 56.

The position of a light source within the field of interest is determined by electronically comparing the outputs of the several photo-cells. It will be appreciated that wherever in the sector of interest a light source may appear, all of the photo-cells can be expected to produce an output pulse, but of different amplitudes. That is, the filter whose pass response is in optical correspondence with the identification channel containing the source of light offers maximum transparency to the signal and its associated photo-cell produces the maximum output signal. With suitable amplitude comparison circuitry, therefore, it is possible to identify the location of a light source as being within one of the identification channels into which the sector of interest is divided.

Careful examination of FIG. 10 will reveal that the system described thus far has certain limitations, the most serious being its inability, with practical available circuit components, to discriminate dependably between the responses of adjacent channels, particularly in the cross-over regions of the pass characteristics. In FIG. 10 there is superimposed on the response characteristics of the three photo-cells, lines indicating the postion of the threshold levels relative to the response characteristics of the system for several different input levels. The voltage level designated $m$ shows, in essence, the relationship that exists between a fixed trigger circuit threshold level which must be overcome before an appropriate indicator will be activated, and the minimum signal response characteristic of the bank of photo-cells. The same threshold level related to input signals of maximum intensity is represented by line $n$. Line $0$, between levels $m$ and $n$ and coinciding with the points of cross-over of the overlapping response characteristics, represents the threshold level for optimum system operation. It will be evident that for signals of minimum amplitude from a particular photo-cell combination occurring near the cross-over region which are of insufficient magnitude to overcome the threshold level $m$ will cause a "dead zone" to occur in the cross-over region. It will likewise be evident that for signals of maximum allowable amplitude occurring near the cross-over region which are of sufficient magnitude to overcome the threshold level $n$ will give a double reading to the indicator apparatus. This is identified as the "double response zone" in FIG. 10. These deficiencies, which will be better understood from the following example, obviously limit the usefulness of the system.

Referring again to FIGS. 9 and 10 assume that a light signal of sufficient intensity to activate the system is present at point $x$, near the center of channel H. A light source at this position will, of course, illuminate all of the sensing devices to some degree, but since it lies near the optical axis of the filter of device 54, the associated photo-cell produces an output of the amplitude designated $x'$ in FIG. 10, sufficient to overcome the threshold level of its respective trigger circuit (for either maximum or minimum signals). Actuation of the trigger circuit energizes the corresponding indicator to signify that the light source is positioned in channel H. The angle of incidence of light rays from a source positioned at X on the filters of sensing devices 52 and 56 is so small that insufficient energy reaches their respective photo-cells to produce a trigger-actuating output signal.

If, on the other hand, a light source of the same intensity is positioned at $y$ in FIG. 9, near the boundary between channels H and J, the light rays strike the filters of sensing devices 54 and 56 with approximately the same angle of incidence whereby their respective photo-cells produce outputs identified as $y''$ and $y'$, respectively (FIG. 10). Should the signals be of maximum intensity, both will be sufficient to overcome the threshold level $n$ to activate a corresponding trigger and indicator, resulting in an ambiguous indication. Similarly, if the intensity of the light source of the order of the minimum acceptable to the system, neither of responses $y'$ or $y''$ is adequate to overcome the applicable threshold level $m$ and no output indication is produced. Between these two-limiting situations is a range where the response of sensing device 54 is only incrementally larger than the response of device 56, making it difficult for the system to accurately determine which of the two signals more closely signifies the location of the light source. The foregoing problem might be solved to some degree by incorporating an automatic gain control in the system for varying the threshold level in correspondence with the intensity of the received energy effectively to maintain the ideal relationship between photo-cell response and threshold level represented by line $0$ throughout the entire dynamic range of operation. Automatic gain control circuits are inherently slow-acting, however, and often complicated, making their usefulness in this application somewhat marginal.

Figure 11:
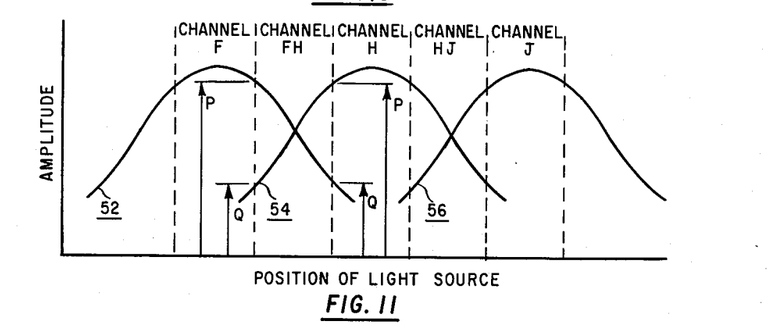
FIG. 11 is a diagram illustrating the utilization of the invention in an optical system of the type shown in FIG. 9.

Improved accuracy of source location can be achieved by utilizing the concept of the present invention of arbitrarily dividing the sector of interest into a larger number of identification channels than sensing devices, as described in connection with the electrical filter case, and comparing the output signals from the sensing devices to indicate from which of the identification channels light energy of maximum intensity emanates. As shown in FIG. 11, which is a reproduction of the photo-cell response characteristics of FIG. 10, channels F, H and J are assigned to the central portion of the output characteristics of sensing devices 52, 54 and 56, respectively, with channels straddling the cross-over regions of the characteristics identified as FH and HJ. As in the freqenucy channelizing embodiment of the invention, the boundary limits of the identification channels are located in terms of the ratio $P/Q$ of the responses of two adjacent sensing devices.

Figure 12:
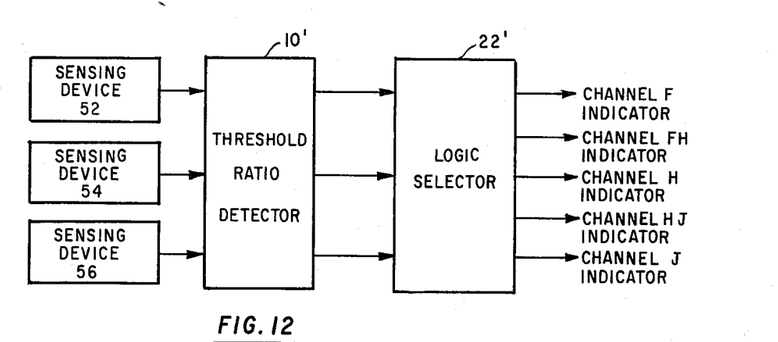
FIG. 12 is a block diagram of an optical system similar to that shown in FIG. 9 and embodying the invention.

FIG. 12 is a block diagram of a system for implementing the channel selection depicted in FIG. 11 and includes, by way of example, three optical sensing devices understood to be spaced as in FIG. 9 to monitor a prescribed sector of interest. The outputs of these sensing devices are applied to a threshold ratio selector 10', which may be of the same form as the circuit of FIG. 6, for comparing the responses of adjacent sensing devices (should there be a response from two, as would be the case if the source were at point $y$) and comparing this ratio with the critical ratio $P/Q$. The ratio selector 10' performs the same functions as were enumerated earlier in describing FIG. 5, producing output signals on one or two, but no more than two, of its output lines. The indicator signals appearing on the output lines of the ratio selector are applied to a logic selector 22', which may be of the form shown in FIG. 8, for indicating in which of the identification channels of FIG. 11 the signal appears, which indication identifies the position of the light source in the sector of interest.

While the invention has been described in connection with the channelization of frequency intelligence in a signal, and in connection with the location of a light source within a predetermined segment, or channel, of a sector of interest, the invention is generally applicable to other intelligence quantizing problems where several signal sensing devices having overlapping response characteristics similar to those shown in the drawings can be employed to monitor a sector or band of interest of the parameter of the signal sought to be channelized. Moreover, the invention is not limited to sensing devices having response characteristics of generally parabolic shape as shown and described in the foregoing specification, but is also applicable to sensing devices having response characteristics differing considerably from this form. Broadly stated, the invention may be utilized with any signal sensing device that produces an output signal whose amplitude is a maximum for a given portion of the range of a parameter of the signal, and decreases in value as the signal parameter departs from said given portion of the range.

In other words, the characteristic starts at a low value at one edge, increases to peak value and then decreases to a low value at the other edge. For the sake of brevity and convenience, the term "peaking response characteristic" will be used in the appended claims to include all response curves having such characteristics. It will be seen that this definition includes response characteristics of triangular or trapezoidal shape, as well as a sharply peaked, or spiked, characteristic.

Various modifications, apart from those shown or suggested may be made in the invention without departing from the true spirit thereof. For example, other types of circuitry than that shown in FIGS. 6 and 8 may be employed in the threshold ratio detector and the logic selector without departing from the invention. It is emphasized also that the number of sensing devices suggested in the two illustrated embodiments of the invention are by way of example only. It is the intention, therefore, that the invention not be limited to what has been shown and described except as such limitations appear in the appended claims.

What is claimed is:

1. A system for channelizing according to frequency signals which may have any frequency within a predetermined band of interest comprising, in combination, a plurality of band pass filters each having input and output terminals and respectively responsive to frequencies in successive adjacent sub-bands of said band of interest and having similar pass-band characteristics, the pass-band characteristic of each of said filters crossing over the characteristics of the two filters adjacent thereto to thereby definne a plurality of adjacent channels of a width determined by the spacing between the points of cross-over of adjacent pass-band characteristics, any two adjacent filters being operative to produce output signals of equal amplitudes in response to an applied signal having a frequency falling at the point of cross-over of their respective pass-band characteristics and to produce output signals of unequal amplitudes in response to an applied signal having a frequency falling in the region of overlap of their respective pass-band characteristics and to either side of the point of cross-over, means for applying an input signal in parallel to the input terminals of all of said filters, and a threshold ratio detector having a like plurality of input terminals connected to respective filter output terminals and a like plurality of output terminals, said threshold ratio detector including means operative to establish a threshold level proportional to the ratio of the amplitudes of the larger to the smaller output signals produced by any two adjacent filters in response to first and second input signals having first and second frequencies respectively below and above the frequency at the point of cross-over of the pass-band characteristics of said two adjacent filters, said first and second frequencies determining the lower and upper boundaries, respectively, of a second plurality of arbitrarily selected channels each narrower than the aforesaid adjacent channels and respectively straddling the points of cross-over of the pass-band characteristics of successive adjacent filters, said threshold ratio detector being operative to produce a signal at one or the other of the ouput terminals of said detector corresponding to any two adjacent filters when the ratio of the larger to the smaller output signals from said any two adjacent filters in response to a given input signal exceeds the ratio determined by said threshold level, indicative that the frequency of the given input signal is outside the arbitrarily selected channel straddling the point of cross-over of the band-pass characteristics of said any two adjacent filters, and to produce a signal at the output terminals of said detector corresponding to both of said any two adjacent filters when the ratio of the larger to the smaller output signals from said any two adjacent filters in response to said given input signal is less than the ratio determined by said threshold level, indicative that the frequency of said given input signal is within the arbitrarily selected channel straddling the point of cross-over of the pass-band characteristics of said any two adjacent filters.

2. The system in accordance with claim 1 further including logic circuitry having a first plurality of input terminals connected to corresponding output terminals of said threshold ratio detector and a plurality of output terminals, one for and corresponding to each of said filters and one for and corresponding to each of said arbitrarily selected channels, said logic circuitry including means operative in response to a signal appearing at one or the other of two adjacent output terminals of said threshold ratio detector to produce an output signal at one or the other of the output terminals of said logic circuitry corresponding to said any two adjacent filters, and operative in response to signals appearing at both of two adjacent output terminals of said threshold ratio detector to produce an output signal at only the output terminal of said logic circuitry corresponding to the arbitrarily selected channel straddling the point of cross-over of said any two adjacent filters.

3. A frequency analyzing system providing output signals by which an unknown frequency within a frequency band of interest may be determined to the accuracy of the width of one of a plurality of identification channels encompassing said band of interest, said system comprising, in combination, at least first, second and third band pass filters respectively responsive to frequencies in successive adjacent sub-bands of said band of interest, said filters having similar pass-band characteristics, the characteristic of said second filter crossing over the characteristics of the adjacent first and third filters, said band of interest being arbitrarily divided into a number of identification channels, alternate ones of which are associated with the central portion of the pass-band characteristics of said first, second and third filters, and intermediate ones of which are between and adjacent said alternate channels and straddle the two points of crossover of the characteristics of said second filter with the characteristics of said first and third filters, any two adjacent filters being operative to produce output signals of equal amplitude in response to an applied signal having a frequency falling at the point of cross-over of their respective pass-band characteristics and to produce output signals of unequal amplitudes in response to an applied signal having a frequency falling in the intermediate identification channel straddling the point of cross-over of the characteristics of said any two adjacent filters, means for applying a signal to be analyzed in parallel to all of said filters, and a threshold ratio detector having at least first, second and third input terminals to which the output signals from said first, second and third filters are respectively applied, said ratio detector including means operative to establish a threshold level proportional to the ratio of the amplitudes of the larger to the smaller output signals produced by said first and second filters in response to an input signal having a frequency falling at a boundary of the intermediate identification channel straddling the point of cross-over of the characteristics of said first and second filters, said detector having at least first, second and third output terminals, one corresponding to each of said first, second and third filters, said detector being operative to produce a signal at said first or second output terminals when the ratio of the larger to the smaller output signals from said first and second filters in response to a given input signal exceeds the ratio determined by said threshold level, indicative that the frequency of the given input signal is in the alternate identification channel associated with the central portion of the pass-band characteristic of either said first or said second filter, and operative to produce a signal at both said first and second output terminals when the ratio of the larger to the smaller output signals from said first and second filters in response to said given input signal is less than the ratio determined by said threshold level, indicative that the frequency of said given input signal is within the intermediate identification channel straddling the point of cross-over of the pass-band characteristics of said first and second filters.

4. The system in accordance with claim 3 further including logic circuitry having at least first, second and third input terminals connected to corresponding output terminals of said ratio detector and a plurality of output terminals, one corresponding to each of said identification channels, said logic circuitry including means operative in response to a signal appearing at one or the other of its first and second input terminals to produce an output signal at one or the other of the output terminals of said logic circuitry corresponding to the alternate identification channel associated with the central portion of the pass-band characteristic of said first and second filters, respectively, and operative in response to signals appearing at both its first and second input terminals to produce an output signal at only the output terminal of said logic circuitry corresponding to the intermediate identification channel straddling the point of cross-over of the pass-band characteristics of said first and second filters.

5. A frequency quantizing system comprising at least first, second and third band pass filters respectively responsive to frequencies in successive adjacent sub-bands of a frequency band of interest and having similar band-pass characteristics each of which crosses over the characteristics of adjacent filters whereby any two adjacent filters are operative to produce signals of equal amplitude in response to an applied signal having a frequency falling at the point of cross-over of their respective characteristics and to produce output signals of unequal amplitudes in response to an applied signal having a frequency falling in the region of crossover of their respective characteristics, said band of interest being arbitrarily divided into first, second, third, fourth and fifth identification channels, the first, third and fifth of which are respectively associated with the central portions of the band-pass characteristics of said first, second and third filters, and the second and fourth of which are respectively intermediate and adjacent said first and third and said third and fifth channels, said second and fourth identification channels respectively encompassing the regions of cross-over of the characteristics of said first and second, and said second and third filters, means for applying a signal of unknown frequency in said band of interest in parallel to said filters, a threshold ratio detector including means for establishing a threshold ratio level proportional to the ratio of the amplitudes of the larger to the smaller output signals of said first and second filters in response to an input signal having a frequency falling at the boundary between said first and second identification channels, said ratio detector including further means for comparing the amplitude ratio of the larger to the smaller output signals from said first and second filters in response to a given input signal with the threshold ratio determined by said threshold level, said ratio detector being operative in response to said amplitude ratio exceeding said threshold ratio to produce an output signal indicative that the frequency of said given input signal is in either said first or said third identification channel, and operative in response to said threshold ratio exceeding said amplitude ratio to produce output signals indicative that the frequency of said given signal is within said second identification channel.

6. The system in accordance with claim 5 further including logic circuitry having at least first, second and third input terminals connected to corresponding output terminals of said ratio detector and a plurality of output terminals, one corresponding to each of said identification channels, said logic circuitry including gate circuit means interconnected with the input and ouput terminals thereof operative in response to a signal appearing at one of said first, second or third input terminals to produce an output signal only at the output terminal of said logic circuitry corresponding to said first, third or fifth identification channel, respectively, and operative in response to signals appearing on both said first and second input terminals or on both said second and third input terminals to produce an output signal only at the output terminal of said logic circuitry corresponding to said second or to said fourth identification channel, respectively.

References Cited by the Examiner

UNITED STATES PATENTS

| | | | |
|---|---|---|---|
| 2,429,229 | 10/47 | Koenig | 324—77 X |
| 2,540,660 | 2/51 | Dreyfus | 324—77 X |
| 2,680,228 | 6/54 | Smith | 324—77 |
| 2,682,366 | 6/54 | Burgett | 324—78 X |
| 2,851,661 | 9/58 | Buland | 324—77 |
| 2,901,697 | 8/59 | Smith | 179—1 X |
| 2,979,609 | 4/61 | Biagi | 324—77 X |
| 3,078,345 | 2/63 | Campanella et al. | 324—77 X |

WALTER L. CARLSON, *Primary Examiner.*

SAMUEL BERNSTEIN, FREDERICK M. STRADER,
*Examiners.*